(12) United States Patent
Nakaishi et al.

(10) Patent No.: US 8,005,361 B2
(45) Date of Patent: Aug. 23, 2011

(54) STATION-SIDE OPTICAL NETWORK TERMINAL APPARATUS, SUBSCRIBER-SIDE OPTICAL NETWORK TERMINAL APPARATUS, AND OPTICAL COMMUNICATION SYSTEM

(75) Inventors: Hiroshi Nakaishi, Tokyo (JP); Tatsuya Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 11/845,868

(22) Filed: Aug. 28, 2007

(65) Prior Publication Data

US 2008/0050116 A1 Feb. 28, 2008

(30) Foreign Application Priority Data

Aug. 28, 2006 (JP) .................... 2006-231306

(51) Int. Cl.
*H04J 14/00* (2006.01)
(52) U.S. Cl. ............. 398/67; 398/68; 398/71; 398/72
(58) Field of Classification Search .......... 398/58, 398/66–68, 70–72
See application file for complete search history.

(56) References Cited

U.S. PATENT DOCUMENTS

| | | | |
|---|---|---|---|
| 7,609,967 B2 * | 10/2009 | Hochbaum et al. ............. 398/67 |
| 2002/0021472 A1 | 2/2002 | Nakaishi | |
| 2004/0052521 A1 * | 3/2004 | Halgren et al. ................. 398/19 |
| 2005/0286500 A1 | 12/2005 | Minami | |
| 2006/0072923 A1 * | 4/2006 | Arikawa et al. ............... 398/155 |

FOREIGN PATENT DOCUMENTS

| | | |
|---|---|---|
| JP | 2003-309621 | 10/2003 |
| JP | 2006-13639 | 1/2006 |
| JP | 2002-57679 | 2/2006 |
| RU | 2081515 | 6/1997 |
| RU | 2095943 | 11/1997 |
| RU | 2124812 | 1/1999 |

OTHER PUBLICATIONS

Russian Patent Office issued a Russian Office Action on Nov. 14, 2008, Application No. 2007132444.
JP Office Action issued on Mar. 22, 2011.

* cited by examiner

*Primary Examiner* — Dalzid Singh
(74) *Attorney, Agent, or Firm* — Young & Thompson

(57) ABSTRACT

While continuously providing a service in an existing optical communication system, a service at another communication speed is realized at low cost. For this reason, a station-side optical network terminal apparatus is configured so that to one light-emitting unit connected are a first processing unit that performs a process to output an optical signal at one communication speed by the light-emitting unit and a second processing unit that performs a process to output an optical signal at another communication speed by the light-emitting unit.

9 Claims, 7 Drawing Sheets

F I G. 2
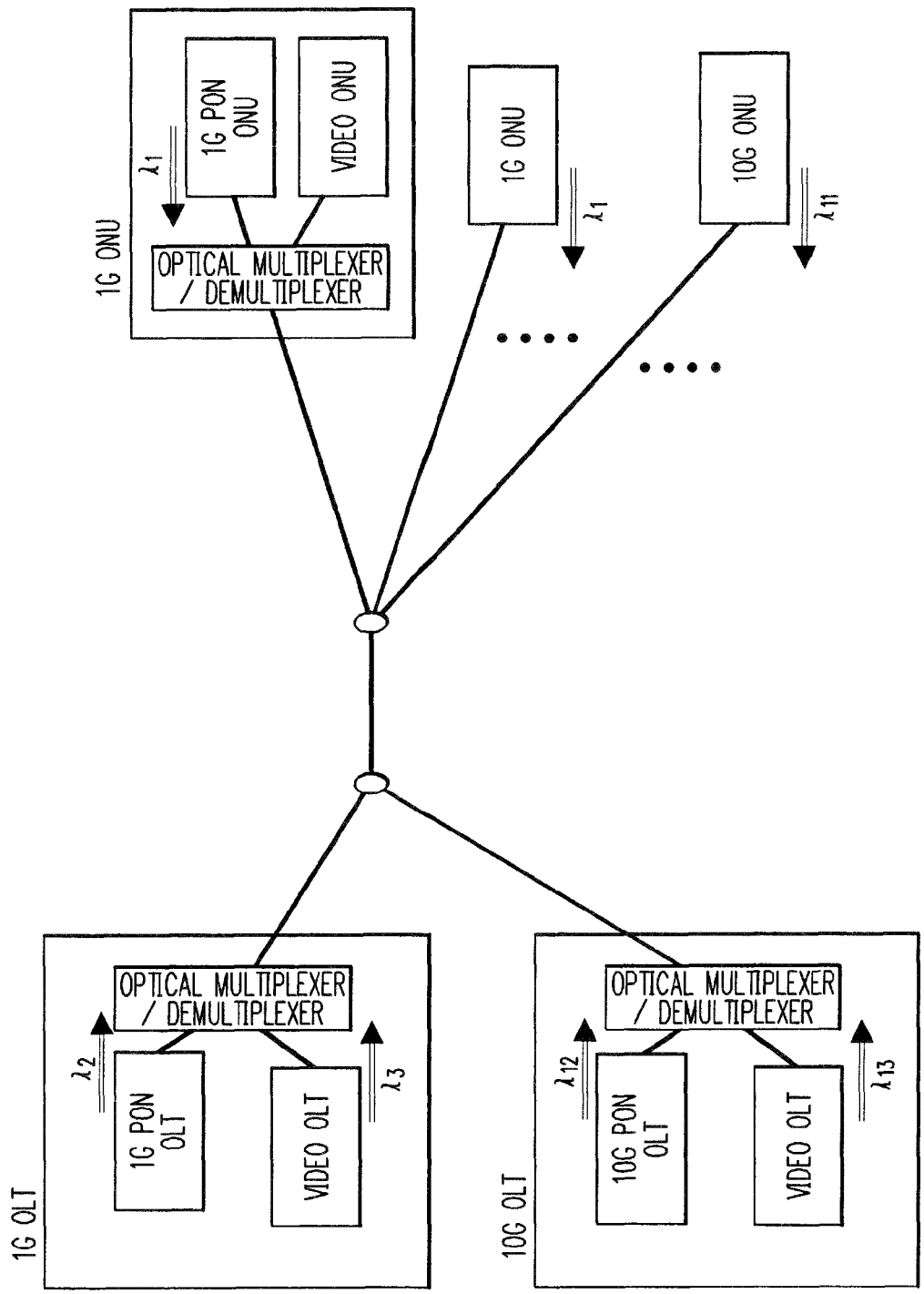

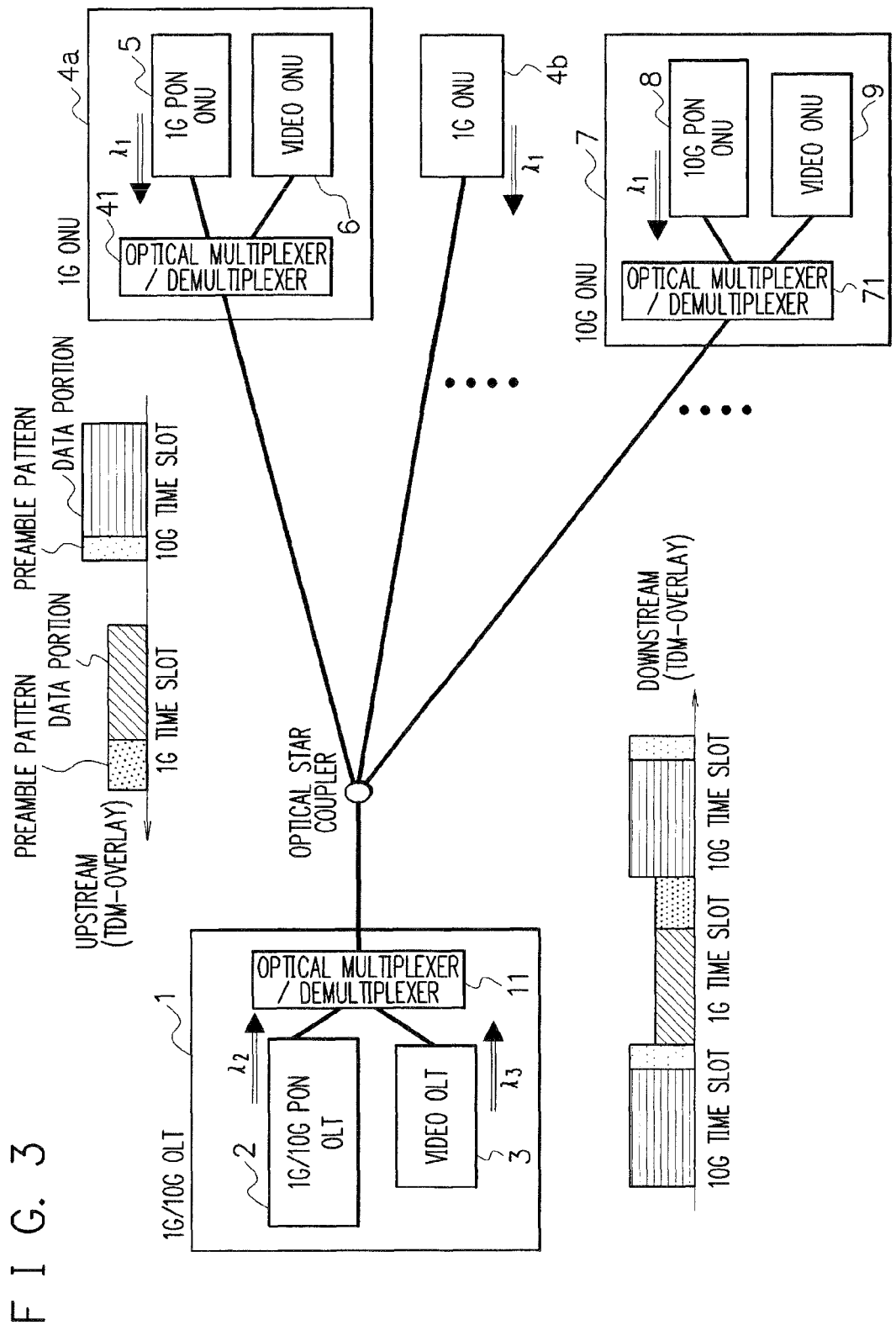
F I G. 3

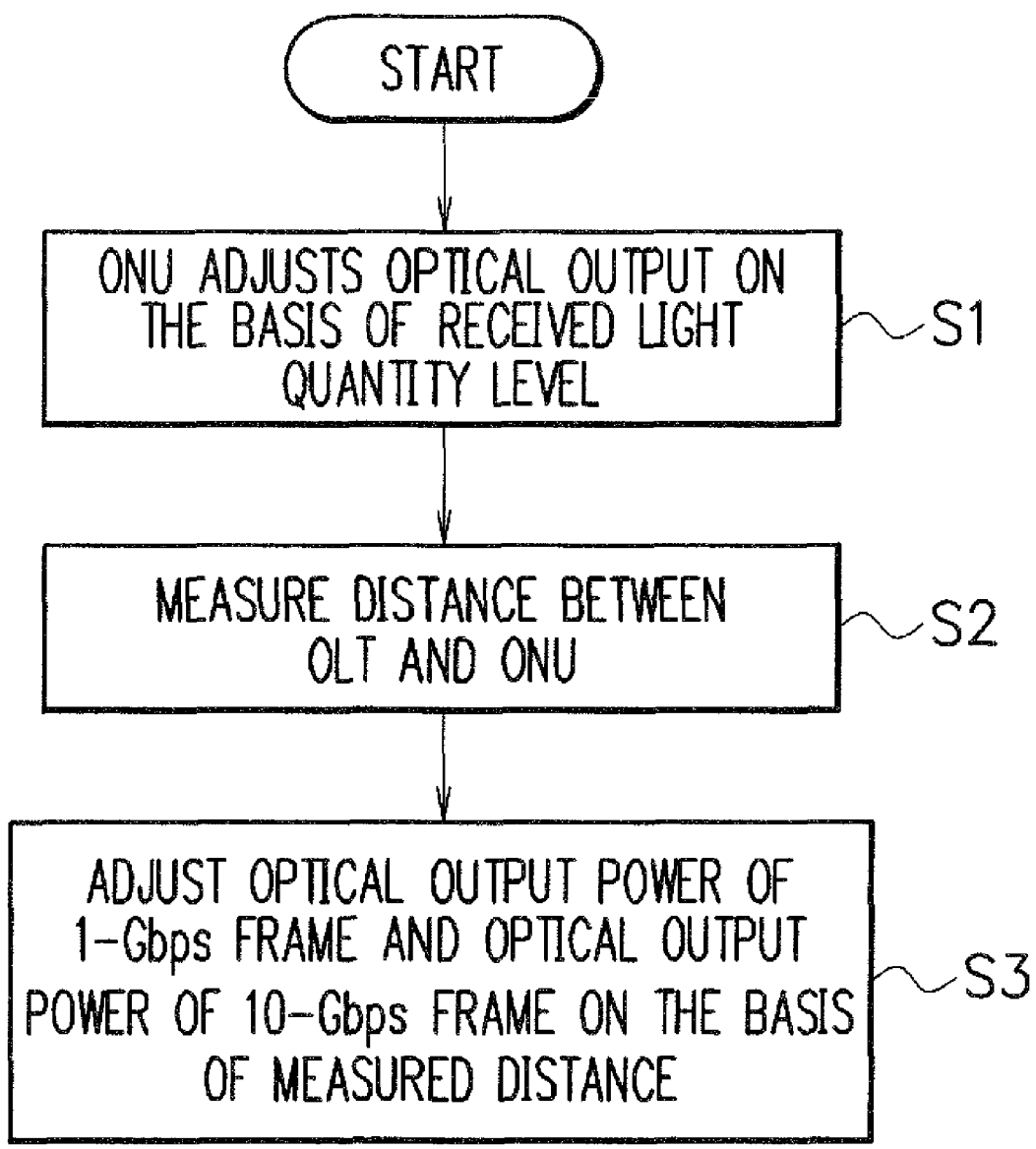

STATION-SIDE OPTICAL NETWORK TERMINAL APPARATUS, SUBSCRIBER-SIDE OPTICAL NETWORK TERMINAL APPARATUS, AND OPTICAL COMMUNICATION SYSTEM

This application is based upon and claims the benefit of priority from Japanese patent application No. 2006-231306, filed on Aug. 28, 2006, the disclosure of which is incorporated herein in its entirety by reference.

BACKGROUND OF THE INVENTION

1. Field of the Invention

The present invention pertains to a station-side optical network terminal apparatus, a subscriber-side optical network terminal apparatus, and an optical communication system such as a PON (Passive Optical Network) to perform transmission/reception of information at a high speed by communication using light as a transmission medium.

2. Description of Related Art

In recent years, with popularization of multimedia service such as video service or internet access, installation of an optical communication system which performs communication connection to a subscriber device by FTTB (Fiber to the Building), FTTH (Fiber to the Home), or the like using light as a transmission medium is advanced.

FIG. 1 shows a configuration of a general PON. In an optical communication system serving as a related art of the present invention as shown in FIG. 1, an optical signal from a station-side optical network apparatus OLT (Optical Line Terminal) is passively split and coupled by an optical star coupler serving as a 1-to-multi connection optical split coupler and connected to a plurality of subscriber-side optical network terminal apparatus ONUs (Optical Network Units) installed in an office or the like through optical fibers.

As a system previously applied by the present applicant, an ATM-PON duplex system which forms a duplex configuration between an optical coupler and a subscriber-side optical network terminal apparatus is known. In this system, switching is performed in units of virtual passes or virtual channels on the basis of switching control information, so that high-speed switching to a spare system without adversely affecting a circuit in which a failure does not occur (for example, see Japanese Patent Application Laid-Open (JP-A) No. 2002-57679 (Patent Document 1)).

As an IP (Internet Protocol) telephone access system previously applied by the present applicant, there is known a system which verifies an IP packet by using an address management table, an IP management table, and a subscriber number management table which associates logical link identifiers of subscriber terminal apparatuses and IP addresses of IP telephone terminals with each other. In this manner, a fixed telephone number is prevented from being used beyond a geographical identification area (for example, see JP-A-2006-13639 (Patent Document 2)).

Problems of the related arts described above will be described below.

When a high-speed service of a PON is to be introduced in the optical communication system according to the related art, the service must be continuously performed to a user using an existing service. For this reason, in order to introduce the high-speed communication service, an OLT for the existing service and an OLT for high-speed communication service must be arranged as illustrated in FIG. 2. Thus, in comparison with provision of only the existing service, the cost further increases. In the example in FIG. 2, the OLT for an existing service and the OLT for a high-speed service are denoted as a 1G OLT and a 10G OLT, respectively.

Since optical signals in different wavelength bands are multiplexed in accordance with communication speeds by wavelength division multiplexing (WDM), a usable wavelength path may be difficult to be assured when a communication speed for providing services and the number of applications increase.

The systems in Patent Documents 1 and 2 described above are not made in consideration of provision of services of a plurality of communication speeds. Therefore, in this case, a cost reduction is not considered.

SUMMARY OF THE INVENTION

An exemplary object of the present invention is to provide a station-side optical network terminal apparatus, a subscriber-side optical network terminal apparatus, and an optical communication system that realizes a service of another communication speed while continuously providing a service in an existing optical communication system.

A station-side optical network terminal apparatus according to an exemplary aspect of the invention is characterized in that to one light-emitting unit, a first processing unit which performs a process to output an optical signal at one communication speed by the light-emitting unit, and a second processing unit which performs a process to output an optical signal at another communication speed by the light-emitting unit are connected.

According to still another aspect of the present invention, there is provided a subscriber-side optical network terminal apparatus including:

a light-emitting unit that transmits an optical signal;

a light quantity level detecting unit that detects a light quantity level received from the station-side optical network terminal apparatus; and a subscriber-side optical output adjusting unit that adjusts an optical output obtained by the light-emitting unit on the basis of a detection result by the light quantity level detecting unit.

According to still another aspect of the present invention, there is provided an optical communication system in which a station-side optical network terminal apparatus and a subscriber-side optical network terminal apparatus are connected, wherein the station-side optical network terminal apparatus is configured so that to one light-emitting unit, a first processing unit that performs a process to output an optical signal at one communication speed by the light-emitting unit and a second processing unit that performs a process to output an optical signal at another communication speed by the light-emitting unit are connected, the subscriber-side optical network terminal apparatus including:

a light-emitting unit that transmits an optical signal;

a light quantity level detecting unit that detects a light quantity level received from the station-side optical network terminal apparatus; and a subscriber-side optical output adjusting unit that adjusts an optical output obtained by the light-emitting unit on the basis of a detection result by the light quantity level detecting unit.

BRIEF DESCRIPTION OF THE DRAWINGS

Features of the disclosed embodiments will be described by way of the following detailed description with reference to the accompanying drawings in which:

FIG. 2 is a block diagram showing a configuration used when services of a plurality of communication speeds are performed by the conventional optical communication system;

FIG. 3 is a block diagram showing a configuration of an optical communication system according to an embodiment of the present invention;

FIG. 7 is a flow chart showing an operation of adjusting an optical output.

DESCRIPTION OF EXEMPLARY EMBODIMENTS

With reference to the accompanying drawings, detailed description will be given to exemplary embodiments to which a station-side optical network terminal apparatus, a subscriber-side optical network terminal apparatus, and an optical communication system according to the present invention are applied.

[Configuration of Optical Communication System]

An optical communication system is configured so that, as shown in FIG. 3, an optical signal from a 1G/10G OLT 1 is split by an optical star coupler and transmitted to a 1G ONU 4 and a 10G ONU 7 as well as in the opposite direction.

The 1G/10G OLT 1 is designed such that optical signals from a 1G/10G PON OLT (station-side optical network terminal apparatus) 2 and from a Video OLT 3 are multiplexed by WDM in an optical coupling/splitting unit 11 and also transmitted in the opposite direction.

The 1G ONU 4 is designed such that optical signals from a 1G PON ONU (example of a subscriber-side optical network terminal apparatus) 5 and a Video ONU 6 are multiplexed by WDM in an optical coupling/splitting unit 41 and also transmitted in the opposite direction.

Similarly, the 10G ONU 7 is designed such that optical signals from a 10G PON ONU (example of a subscriber-side optical network terminal apparatus) 8 and a Video ONU 9 are multiplexed by WDM in an optical coupling/splitting unit 71 and also transmitted in the opposite direction.

In optical communication between the 1G/10G PON OLT 2 and the 1G PON ONU 5, a wavelength equal to an optical wavelength used in optical communication between the 1G/10G PON OLT 2 and the 10G PON ONU 8 is used. More specifically, in the configuration, optical communication at 1 Gbps (Giga Bit per Second) and optical communication at 10 Gbps are performed at the same optical wavelength.

Figure 1:
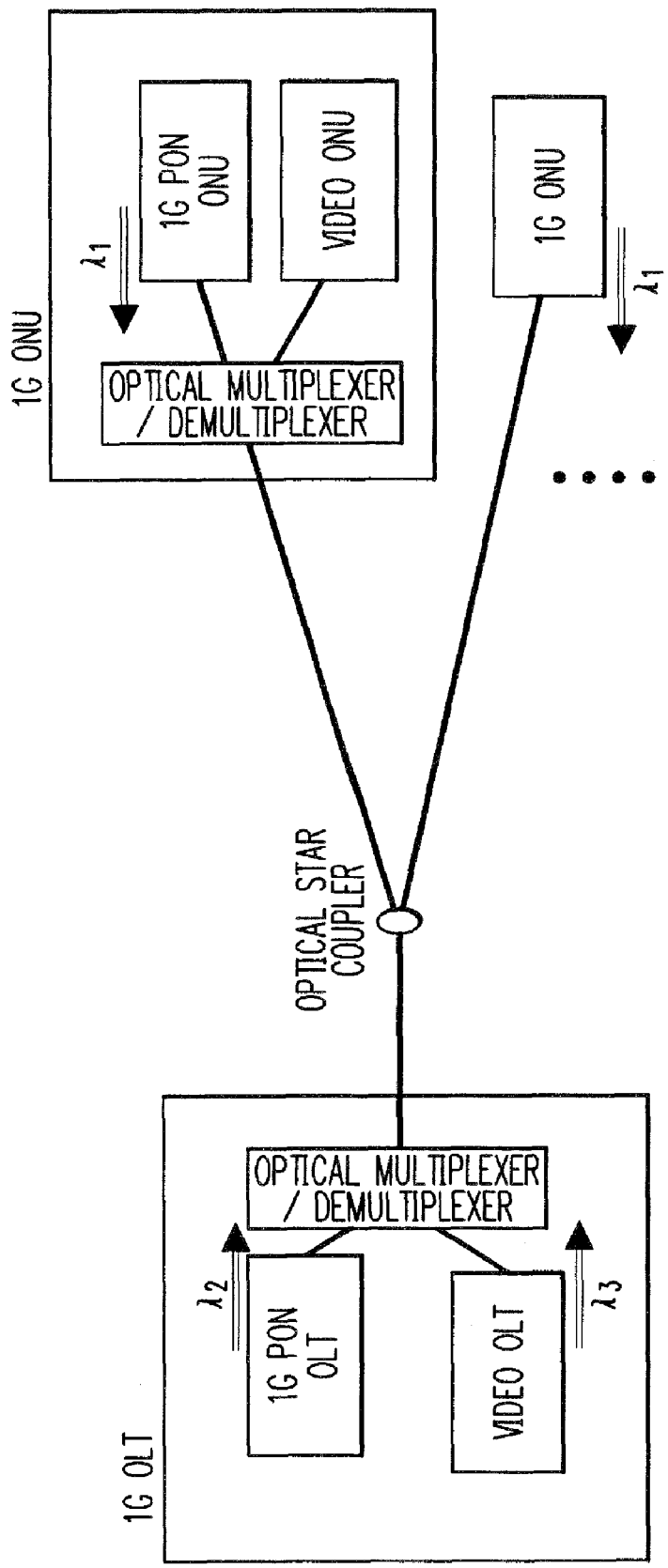
FIG. 1 is a block diagram showing a configuration of a conventional optical communication system.
Figure 4:
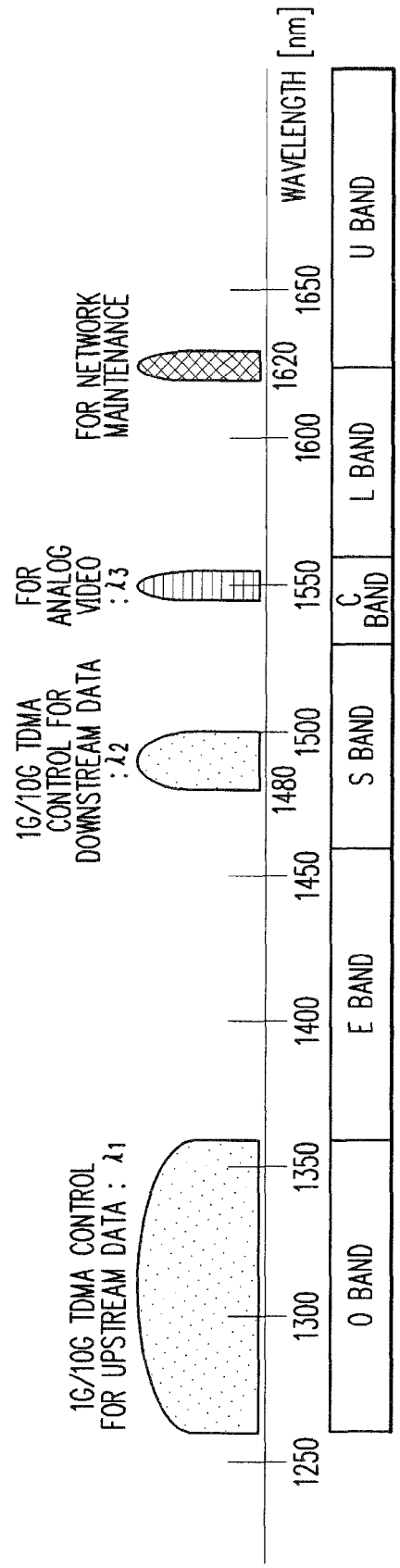
FIG. 4 is a diagram showing allocations of optical wavelengths.

Allocations of optical wavelengths are shown in FIG. 4. As shown in FIG. 4, a wavelength λ1 is used for both 1 Gbps and 10 Gbps data in upstream data transmission, and a wavelength λ2 is used for both 1 Gbps and 10 Gbps in downstream data transmission.

In this manner, by using time division multiple access (TDMA), optical communication is performed at the same optical wavelength and two communication speeds.

[Transmission/Reception and Idle Pattern of Optical Signals Having Different Communication Speeds]

As described above, in order to transmit and receive optical signals having different communication speeds at the same optical wavelength, OLTs and ONUs in the optical communication system according to the embodiment transmits an idle pattern as a preamble pattern before data units of the frames, as shown in FIG. 3.

In this manner, a time difference is set between data signals having the communication speeds. Even though the communication speeds of signals having the same optical wavelength are switched, a signal receiving circuit is designed to follow the communication speeds.

The OLT changes transmission time of a preamble pattern depending on communication speeds. More specifically, even though preamble patterns having equal numbers of bits at a communication speed of 1 Gbps and a communication speed of 10 Gbps, transmission times are different from each other. For this reason, the transmission times of the preamble patterns are set depending on the communication speeds, so that preamble patterns having lengths perfect for the communication speeds are transmitted.

In general, transmission time of a preamble pattern is fixed. However, in the embodiment, transmission times of the preamble patterns are changed depending on the communication speeds as described above. For this reason, even though optical signals having a plurality of different communication speeds are transmitted and received at one optical speed, data transmission time is prevented from being compressed by an excessively long preamble pattern, and data transmission/reception is prevented from being deteriorated in reliability by an excessively short preamble pattern. This enables accurate and stable optical communication to be realized.

In this manner, since optical signals having different communication speeds are transmitted and received at the same optical wavelength, the optical signals are transmitted and received by only one optical module.

Accordingly, it is possible to assure reliable communication the cost of which is not higher than that of a conventional OLT which transmits and receives only an optical signal having one communication speed and in which data signals having different communication speeds do not collide with each other.

[Main Configuration of OLT]

Figure 5:
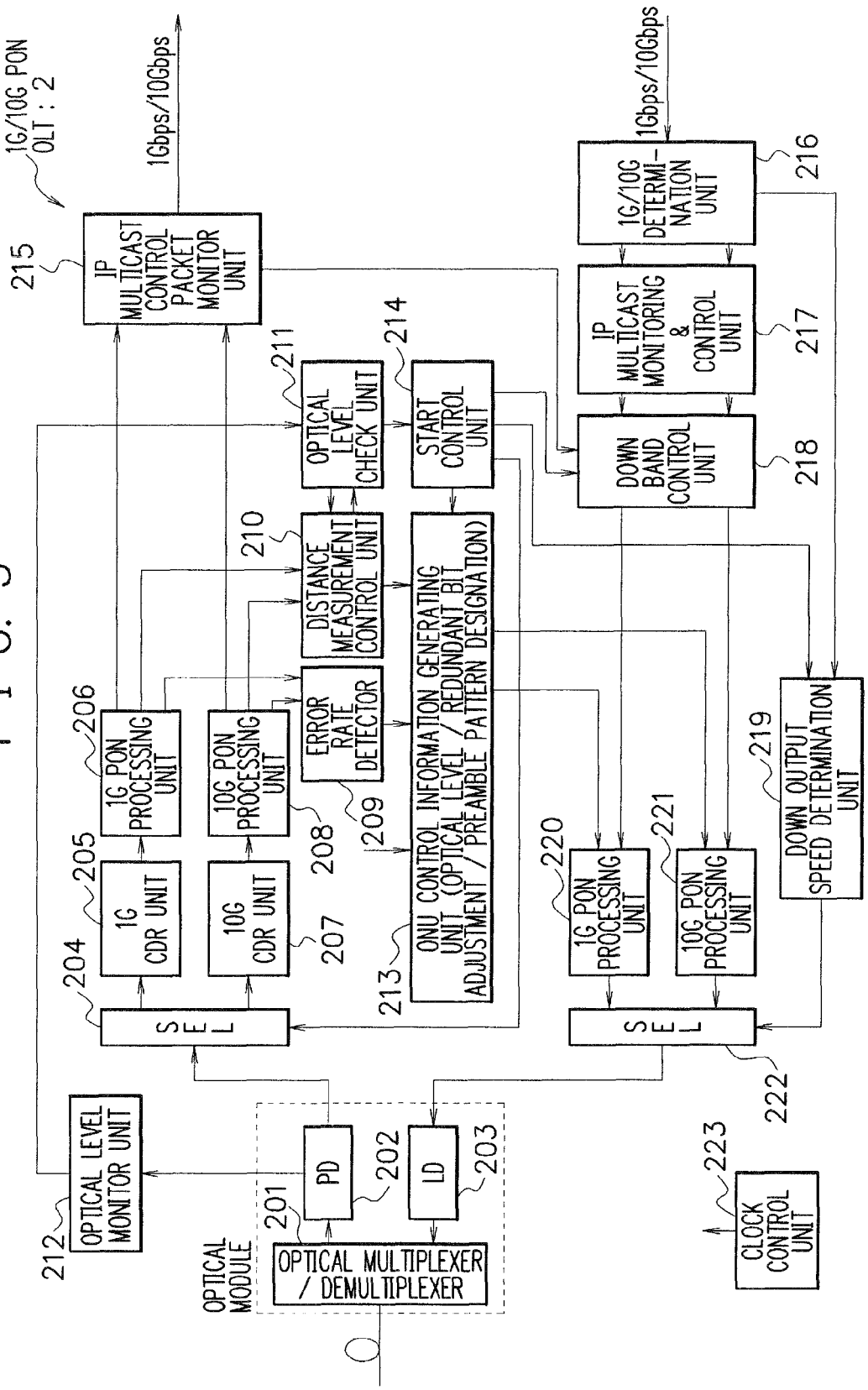
FIG. 5 is a block diagram showing a configuration of a main part of a 1G/10G PON OLT 2.

A main configuration of the 1G/10G PON OLT 2 will be described with reference to FIG. 5.

An optical module that transmits and receives an optical signal includes a photodiode (PD) 202 and an laser diode (LD) 203, and is designed to multiplex an optical signal received by the PD 202 and an optical signal transmitted by the LD 203 by WDM in an optical coupling/splitting unit 201.

When an optical signal is received by the PD 202, a selector (SEL) 204 selects a 1G CDR (Clock And Data Recovery) unit 205 or a 10G CDR unit 207 as a destination, depending on whether the signal is a 1-Gbps frame or a 10-Gbps frame.

When the optical signal is a 1-Gbps frame, the 1G CDR unit 205 extracts a clock and data information from the transmitted frame to restore information. A 1G PON processing unit 206 performs predetermined processing to the restored information to read the transmitted data.

When the optical signal is a 10-Gbps frame, the 10G CDR unit 207 extracts a clock and data information from the transmitted frame to restore information. A 10G PON processing unit 208 performs predetermined processing to the restored information to read the transmitted data.

When the optical signal is a 10-Gbps frame, the 10G CDR unit 207 extracts a clock and data information from the transmitted frame to restore information. A 10G PON processing unit 208 performs predetermined processing to the restored information to read the transmitted data.

In this manner, an error rate detector 209 detects an error rate from a redundant bit added by forward error correction (FEC) with respect to the information processed by the 1G PON processing unit 206 or the 10G PON processing unit 208.

A distance measurement control unit 210 controls distance measurement between an OLT and an ONU.

An IP multicast control packet monitor unit 215 monitors whether the transmitted frame includes an IP multicast control packet to output the frame to the subsequent processing unit.

When an optical level monitor unit 212 detects a light quantity level of the optical signal received by the PD 202, an optical level check unit 211 checks the detected optical level. On the basis of the check result, a start control unit 214 designates the SEL 204, an ONU control information generating unit 213, a downstream band control unit 218, and a downstream output speed determination unit 219 to be started.

The ONU control information generating unit (redundant bit length determining means and redundant bit length designating means) 213 receives information inputs from the error rate detector 209, the distance measurement control unit 210, the start control unit 214, and various function units related to control of other ONUs to generate control information of an optical signal output to the ONU. The control information of the optical signal is an information signal to perform length adjustment of redundant bits added by FEC in, for example, a 1G PON processing unit 220, a 10G PON processing unit 221, and the ONU, level control of an optical output power, length control of a preamble pattern, and the like.

As a configuration that performs processing to a signal output to a downlink to the ONU, a 1G/10G determination unit 216 first determines whether the signal transmitted by the previous processing unit is output at 1 Gbps or 10 Gbps.

An IP multicast monitoring & control unit 217 monitors whether an optical signal to be output includes a frame transmitted by an IP multicast.

The downstream band control unit 218 performs band control of an optical signal output to the downlink on the basis of a monitoring result of the signal of an uplink obtained by the IP multicast control packet monitor unit 215.

Processing to output an optical signal subjected to the band control is performed by the 1G PON processing unit (first processing means) 220 when the signal is a 1 Gbps signal and is performed by the 10G PON processing unit (second processing means) 221 when the signal is a 10 Gbps signal. At this time, the 1G PON processing unit 220 or the 10G PON processing unit 221 adds redundant bits having lengths based on control information (designation signals) received from the ONU control information generating unit 213 to frames by FEC, respectively.

The 1G/10G determination unit 216 determines an input data speed (1 Gbps or 10 Gbps) to cause the downstream output speed determination unit 219 to determine a communication speed of the downlink. The length of a preamble pattern depending on the communication speed is determined as described above.

On the basis of a decision result obtained by the downstream output speed determination unit 219, a selector (SEL) 222 selects a connection between the 1G PON processing unit 220 or the 10G PON processing unit 221 and the LD 203. The SEL 222 adds preamble patterns having lengths determined on the basis of communication speeds to the heads of data frames of communication speeds as illustrated in FIG. 3 such that the data frames can be transmitted.

In this manner, information processed by the 1G PON processing unit 220 or the 10G PON processing unit 221 is output to a downlink by the LD 203 as a data frame added with a preamble pattern having a length depending on a communication speed.

A clock control unit 223 generates a master clock that performs the processing of the signal information and controls a clock of a 1-Gbps signal and a clock of a 10-Gbps signal to synchronize the clocks with each other on the basis of the master clock.

In this manner, when transmission and reception are performed on the basis of the same master clock on the uplink and the downlink, the signals of the uplink and the downlink are reliably synchronized with each other. Available examples of a method using the same clock include a method of performing adjustment timing by using a phase locked loop (PLL) circuit.

[Main Configuration of ONU]

A main configuration of an ONU according to the embodiment will be described below.

Figure 6:
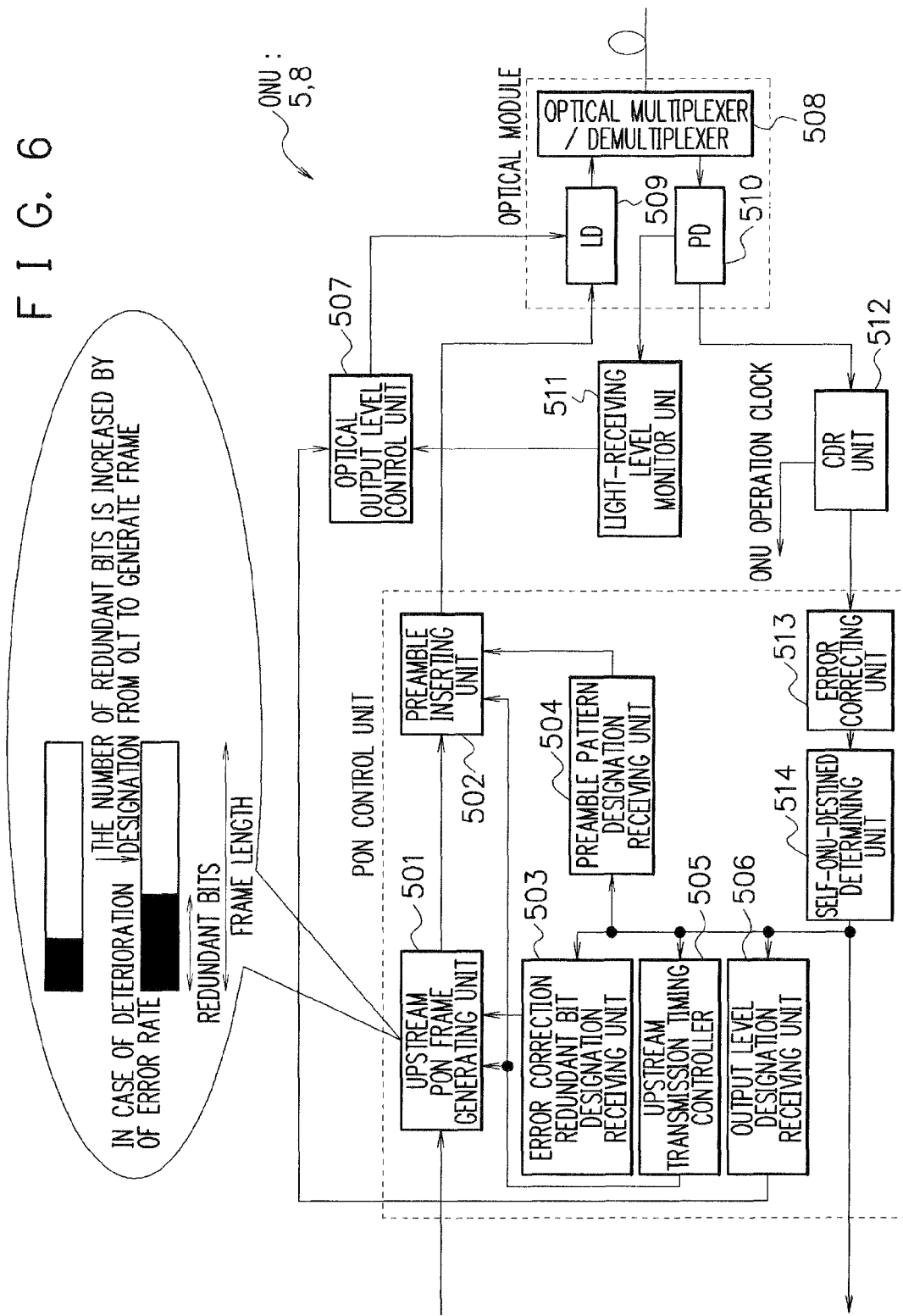
FIG. 6 is a block diagram showing a configuration of a main part of a 1G PON ONU 5.

The configurations of the main parts of the 1G PON ONU 5 and the 10G PON ONU 8 shown in FIG. 3 are equal to each other except for corresponding communication speeds. For this reason, the main configuration of the 1G PON ONU 5 will be described below as an example with reference to FIG. 6.

An optical module which transmits and receives an optical signal includes a PD 510 and an LD 509, and is designed such that an optical signal transmitted by the LD 509 and an optical signal received by the PD 510 are multiplexed by WDM in an optical coupling/splitting unit 508.

When an optical signal is received by the PD 510, a CDR unit 512 extracts a clock and data information from the received frame to restore information. The clock is utilized as a clock that controls an operation of the main body of the ONU. In this manner, a clock of the OLT and a clock of the ONU are synchronized.

With respect to the information restored by the CDR unit 512, an error correcting unit 513 detects and corrects an error of a frame by FEC on the basis of added redundant bits.

A self-ONU-destined determining unit 514 determines the frame the error of which is corrected is transmitted toward the ONU. When the frame is transmitted toward the ONU, the frame is transmitted to a subsequent processing unit.

With respect to the information of, the frames received as described above, an error correction redundant bit designation receiving unit 503 receives information of a designation signal from an OLT in relation to the length of redundant bits added by FEC, and designates an upstream PON frame generating unit 501 to add the redundant bits having the length based on the designation.

A preamble pattern designation receiving unit 504 receives a designation of a length of an idle pattern transmitted as a preamble pattern to the head of a data portion of each frame from the OLT. The upstream PON frame generating unit 501 is designated to transmit an idle pattern having the length based on the designation as a preamble pattern.

An upstream transmission timing controller 505 controls a frame transmission timing to an uplink by the upstream PON frame generating unit 501.

An output level designation receiving unit 506 receives a designation of level control of an optical output power from the OLT and transmits a designation to an optical output level control unit 507 such that an optical output is transmitted from the LD 509 at a power level based on the designation.

To the optical output level control unit 507, input is an optical output level of the optical signal received by the PD 510 and detected by a light-receiving level monitor unit 511. In this manner, the optical output level is also controlled on the basis of the optical output level of the received optical signal.

The upstream PON frame generating unit 501 generates a frame added with redundant bit having a length based on a designation from the OLT on the basis of each designation transmitted as described above to send the frame to the uplink. The preamble inserting unit 502 inserts a preamble pattern having a length based on the designation transmitted as described above into the generated frame.

On the basis of the data obtained by adding the preamble pattern to the data frame, the LD 509 performs data transmission to the uplink.

[Transmission of Optical Signals Having Different Communication Speeds, and Error Correction Scheme]

In the optical communication system according to the embodiment, as described above, a small number of redundant bits to a head of data as an FEC to constitute each frame, so that an error caused by imperfect transmission is detected and corrected.

In this case, the error rate detector 209 of the OLT detects an error rate of each communication speed. Based on the detected error rate, the ONU control information generating unit 213 determines a length of redundant bits per frame of each communication speed. The ONU control information generating unit 213 transmits the length of the redundant bits per frame as a designation signal to the 1G PON processing unit 220, the 10G PON processing unit 221, and each ONU.

The designation signal is received by the error correction redundant bit designation receiving unit 503 of the ONU, and a designation is transmitted to the upstream PON frame generating unit 501. The upstream PON frame generating unit 501 generates a data frame having the redundant bit having the length based on the designation from the ONU control information generating unit 213 to transmit the data frame to the uplink.

The 1G PON processing unit 220 or the 10G PON processing unit 221 of the OLT receives a designation signal obtained by the ONU control information generating unit 213 and generates the data frame having the redundant bit having the length based on the designation from the ONU control information generating unit 213 to transmit the designation signal to the downlink.

As described above, with respect to both the uplink and the downlink, the lengths of redundant bits are appropriately controlled in units of communication speeds, so that an error correction capability is kept at an appropriate level.

When the error correction capability is improved, an amount of data that is transmitted by one frame decreases. For this reason, an error generated in a transmission path is measured to determine the length of redundant bits such that predetermined error correction capability is obtained depending on an amount of generated error.

In this manner, even though optical signals having different communication speeds are mixed in one optical wavelength, appropriate error correction capability and an amount of data transmitted per frame are controlled in a balanced manner, depending on the respective communication speeds.

In the description above, the ONU control information generating unit 213 determines a length of redundant bits per frame for each communication speed on the basis of the error rate detected by the error rate detector 209. However, the method of determining a redundant bit length is not limited to the above description. For example, the length of the redundant bits may be determined on the basis of a distance between the OLT and the ONU measured by the distance measurement control unit 210.

In the above configuration, when the distance between the OLT and the ONU measured by the distance measurement control unit 210 is longer than a predetermined length, the length of the redundant bits may be increased depending on the length of the distance. The method of calculating the length of the redundant bits from the distance, various calculation methods determined in advance may be used.

In this manner, the length of the redundant bits is determined on the basis of the distance between the OLT and ONU, thereby enables stable control of the length of the redundant bits.

The following configuration may be used. That is, on the basis of a setting input or the like by a user, a length of redundant bits per frame can be selectively determination based on an error rate detected by the error rate detector 209 as described above or determination based on the distance between the OLT and ONU measured by the distance measurement control unit 210 as described above.

[Idle Pattern Transmission in No-Signal State]

An idle pattern in signal transmission in an optical communication system will be described below.

As described above, in the optical communication system, idle patterns having lengths depending on communication speeds are sent to heads of data signals, respectively, in order to reliably transmit and receive optical signals having different communication signals.

The ONU transmits an idle pattern even in an upstream no-signal state.

More specifically, when transmission of a data frame to an uplink by an optical signal is started by the ONU, an OLT synchronizes a signal, detects whether the received optical signal is a 1-Gbps signal or a 10-Gbps, and then performs a receiving process. For this reason, if an optical signal is not transmitted in a no-signal state, transmission of the optical signal is started from when bit synchronization is performed to the optical signal received by the OLT. Consequently, data processing of the transmitted optical signal may be late.

Thus, the ONU is designed to transmit an idle pattern even though no signal is output to the uplink, so that the OLT always maintains bit synchronization to an optical signal and reliably reacts with an optical signal transmitted at a high communication speed from the ONU.

[Scramble Control to Idle Pattern]

In the optical communication system, scramble control is performed to idle patterns at all communication speeds in the uplink and the downlink, in order to prevent an optical signal in another wavelength band from being adversely affected.

An adverse affect to the optical signal in the other wavelength band is caused by, for example, so-called raman amplification. In raman amplification, induced emission is caused by raman scattering from excited light being incident on an optical fiber to obtain amplification in a wavelength band longer than the wavelength of the excited light by about 100 nm. Due to this raman amplification, an optical signal of the downlink may adverse affect an analog Video signal of a cable television (CATV) or the like.

More specifically, the idle pattern described above has a frequency that is an integral multiple of a frequency of a specific pattern. For this reason, a frequency used in an analog Video signal of a CATV or the like is an integral multiple of a frequency of a pattern used as an idle pattern, the raman amplification described above may adversely affect transmission/reception of the analog Video signal.

In the optical communication system, scramble processing is performed to a preamble pattern or all idle patterns used in a no-signal state at the communication speeds in the uplink and the downlink. More specifically, the OLT or ONU which performs communication applies scramble processing to all the idle patterns to be transmitted.

As a method of the scramble processing, various methods such as a technique which encodes patterns into pseudo random bit strings by using, for example, spectrum diffusion may be used.

In the optical communication system, as described above, the scramble processing is performed to the preamble pattern or all the idle patterns used in a no-signal state to prevent a frequency used in an analog Video signal of a CATV or the like from being an integer multiple of the frequency of the idle pattern.

With the raman amplification described above, transmission and reception of an analog Video signal are prevented from being adversely affected, thereby achieving reliable and stable communication.

In particular, when a CATV provider performs data communication on a channel in a wavelength band affected by the raman amplification, the scramble control is required.

For this reason, it is apparent that all providers who participate in this optical communication system to use analog Video signals do not perform data transmission on a channel in a wavelength band affected by the raman amplification, the scramble control may not be performed. More specifically, when it is apparent that an apparatus that uses, in optical communication, a wavelength band that may affect a channel in another wavelength band by the raman amplification is not included in the optical communication system, the scramble control may be designed to be performed.

[Adjustment of Optical Output]

Adjustment of an optical output in the optical communication system will be described below with reference to the flow chart in FIG. 7.

In 10-Gbps transmission, communication having a speed higher than 1 Gbps is realized. Thus, as a countermeasure against noise, an optical output is desirably larger that in communication at 1 Gbps. However, when an optical output is excessively large in communication at 1 Gbps, a problem is posed. For this reason, appropriate adjustment of an optical output must be performed at any communication speed.

The light-receiving level monitor unit 511 of the ONU detects a light quantity level received by the PD 510. On the basis of the detected light quantity level, the optical output level control unit 507 adjusts an optical output level (step S1).

Under the control of the distance measurement control unit 210 of the OLT, a distance from the OLT to the ONU is measured (step S2).

As the distance measurement method, the following method or the like is known. That is, for example, an OLT transmits a signal of the start of distance measurement, and receives a return signal for the distance measurement signal from the ONU, so that a distance is measured by delay time from transmission of a signal of the start of distance measurement to reception of the return signal.

On the basis of the distance information measured as described above, the ONU control information generating unit 213 calculates a transmission loss at the distance. Depending on the transmission loss, optical output levels of the 1-Gbps signal and the 10-Gbps signal are determined, respectively (step S3).

More specifically, when the distance is short, an optical output the light quantity level of which is lowered depending on the distance is calculated by a predetermined calculating method to adjust the level to the output level. When the distance is long, an optical output the light quantity level is increased depending on the distance is calculated by the predetermined calculating method to adjust the level to the output level.

The distance measurement is performed such that timing sharing is obtained for the communication speeds. That is, distances are sequentially measured for the communication speeds such that timings at which frames for distance measurement are transmitted and received do not overlap.

In this manner, accurate distance measurement is performed for the respective communication speeds without being affected by other factors.

When the OLT transmits a signal of a start of distance measurement, and receives a return signal from the ONU with respect to the communication speeds, time synchronization for a counter is performed on the basis of control of a master clock obtained by the clock control unit 223. Since a transmission slot position of the start of distance measurement is determined on the basis of the time synchronization, reliable time synchronization is assured by distance measurements at the respective communication speeds.

As described above, after an output of the uplink is adjusted based on a light-receiving level in the above step S1 as adjustment for an optical output, an output of the downlink is adjusted based on the distance in steps S2 and S3, which enables optical output adjustment with higher accuracy.

The adjustment of the optical output is not necessarily performed by all the processes in the above steps S1, S2 and S3. The adjustment may be designed to be performed by only step S1 or only S2 and S3. More specifically, optical output adjustment may be performed by any one of adjustment based on a light-receiving level in the above step S1 and adjustment based on a distance in the above steps S2 and S3.

[Effect]

As described above, according to the optical communication system, the OLT handles services at two communication speeds, i.e., 1 Gbps and 10 Gbps while continuously providing an existing service in the optical communication system at a speed of 1 Gbps. This makes it possible to provide the services at both the communication speeds at a cost almost equal to the cost generating when only an existing service is provided.

When services at two communication speeds, i.e., 1 Gbps and 10 Gbps are to be provided in the optical communication system, control is performed such that the clock of 1 Gbps and the clock of 10 Gbps are synchronized with each other on the basis of the same master clock obtained by the clock control unit 223. This enables reliable maintenance of synchronization between two communication speeds such as phase synchronization, frequency synchronization, or time synchronization of transmission slot positions.

In the optical communication system described above, optical outputs are appropriately adjusted on the basis of a distance between the OLT and the ONU or light-receiving amounts. For this reason, countermeasures against noise are performed for two communication speeds, i.e., 1 Gbps and 10 Gbps, and communication reliability is improved.

In the optical communication system, preamble patterns of transmission times depending on the communication speeds of frames are transmitted to the heads of data frames with respect to two communication speeds, i.e., 1 Gbps and 10 Gbps, respectively. For this reason, data of the two communication speeds are not mixed with each other, and a circuit used in reception can reliably react with the communication speeds. In addition, the transmission times of the data frames are not excessively short due to the preamble patterns, and appropriate data transmissions at the two communication speeds are achieved.

In the optical communication system, the error rate detector 209 of the OLT detects error rates of the communication speeds and appropriately controls the lengths of redundant bits for the communication speeds on the basis of the detected error rates. This enables control of appropriate error correction capability and an amount of data transmitted per frame in a balanced manner.

In the optical communication system, the distance of redundant bits to be added as an FEC is determined on the basis of a distance between the OLT and the ONU measured by the distance measurement control unit 210 of the OLT. In this manner, appropriate error correction capability and an amount of data transmitted per frame can be controlled in a balanced manner depending on the distance between the OLT and the ONU.

In the optical communication system, it is also selected on the basis of a setting input by a user whether the length of the redundant bits is determined on the basis of the error rate detected by the error rate detector 209 or on the basis of a distance between the OLT and the ONU measured by the distance measurement control unit 210. With this configuration, FEC control methods is flexibly switched depending on arrangement states of apparatuses or network states.

In the optical communication system, scramble control is performed to an idle pattern to provide a highly reliable communication system in which another signal is not affected by raman amplification.

[About Above-Described Embodiment]

The above embodiment is an exemplary embodiment of the present invention, and the invention is not limited to that embodiment and can be variously changed on the technical idea of the invention. For example, the number of various OLTs and ONUs is not limited to the number shown in FIG. 3, and arbitrarily determined.

As described above, a station-side optical network terminal apparatus according to an exemplary embodiment configured so that to one light-emitting module connected are a first processing unit that performs a process to output an optical signal at one communication speed by the light-emitting unit and a second processing unit that performs a process to output an optical signal at another communication speed by the light-emitting unit.

The station-side lubrication optical network terminal apparatus according to an exemplary embodiment includes clock control unit for controlling the first processing unit and the second processing unit by the same clock.

The station-side optical network terminal apparatus according to an exemplary embodiment includes distance measurement unit for measuring a distance to a subscriber-side optical network terminal apparatus, and optical output adjusting unit for adjusting an optical output obtained by the light-emitting unit on the basis of the measurement result obtained by the distance measurement unit.

In the station-side optical network terminal apparatus according to an exemplary embodiment, the distance measurement unit performs measurement at one of the communication speeds and measurement at the other communication speed such that time zones do not overlap.

In the station-side optical network terminal apparatus according to an exemplary embodiment, the distance measurement unit performs time synchronization of the measurement at one of the communication speeds and the measurement at the other communication speed on the basis of a clock of the clock control unit.

The station-side optical network terminal apparatus according to an exemplary embodiment includes redundant bit length determining unit for determining a length of redundant bits added to each frame for error correction on the basis of a measurement result obtained by the distance measurement unit.

The station-side optical network terminal apparatus according to an exemplary embodiment includes an error rate detecting unit for detecting an error rate, and a redundant bit length determining unit for determining a length of redundant bits added to each frame for error correction on the basis of the error rate detected by the error detecting unit.

The station-side optical network terminal apparatus according to an exemplary embodiment includes a redundant bit length designating unit for transmitting the length of the redundant bits added to each frame for error correction to the first processing unit, the second processing unit, and a subscriber-side optical network terminal apparatus as designation signals on the basis of a determination result obtained by the redundant bit length determining unit, wherein the first processing unit and the second processing unit add redundant bits having lengths based on the designation signals received from the redundant bit length designating unit to the frames for error correction to transmit the frames.

The station-side optical network terminal apparatus according to an exemplary embodiment includes a preamble pattern transmitting unit for transmitting, to a head of each frame transmitted by the light-emitting unit, a preamble pattern of transmission time depending on the communication speed of the frame.

The station-side optical network terminal apparatus according to an exemplary embodiment includes a scramble control unit for performing scramble control to an idle pattern transmitted as the preamble pattern.

The station-side optical network terminal apparatus according to an exemplary embodiment includes a preamble pattern transmitting unit for transmitting, to a head of each frame transmitted by the light-emitting unit, a preamble pattern of transmission time depending on the communication speed of the frame.

The station-side optical network according to an exemplary embodiment includes a scramble control unit for performing scramble control to an idle pattern transmitted as the preamble pattern.

The station-side optical network terminal apparatus according to an exemplary embodiment includes: an error rate detecting unit for detecting an error rate; and a redundant bit length determining unit for determining a length of redundant bits added to each frame for error correction on the basis of the error rate detected by the error detecting unit to transmit the length to the subscriber-side optical network terminal apparatus as a designation signal.

A subscriber-side optical network terminal apparatus according to an exemplary embodiment includes: a light-emitting unit for transmitting an optical signal; a light quantity level detecting unit for detecting a light quantity level received by a station-side optical network terminal apparatus; and a subscriber-side optical output adjusting unit for adjusting an optical output of the light-emitting unit on the basis of a detection result obtained by the light quantity level detecting unit.

A subscriber-side optical network terminal apparatus according to an exemplary embodiment includes: a light-emitting unit for transmitting an optical signal; and a continuous idle pattern transmitting unit for causing the light-emitting means to transmit an idle pattern in a no-signal state.

A subscriber-side optical network terminal apparatus according to an exemplary embodiment includes: a light-emitting unit for transmitting an optical signal; and a preamble pattern transmitting unit for transmitting an idle pattern as a preamble pattern having a length based on a designation received from the station-side optical network terminal apparatus to a head of each frame transmitted by the light-emitting unit.

The subscriber-side optical network terminal apparatus according to an exemplary embodiment includes a scramble control unit for performing scramble control to an idle pattern to be transmitted.

A subscriber-side optical network terminal apparatus according to an exemplary embodiment includes a clock information extracting unit for extracting clock information from the optical signal received from the station-side optical network terminal apparatus, wherein time synchronization of optical signals to be transmitted and received is performed on the basis of the extracted clock.

A subscriber-side optical network terminal apparatus according to an exemplary embodiment includes a frame generating unit for changing a length of redundant bits added to a frame for error correction on the basis of a designation received from the station-side optical network terminal apparatus.

An optical communication system according to an exemplary embodiment includes the station-side optical network terminal apparatus and the subscriber-side optical network terminal apparatus that are connected to each other.

As described above, the invention provides an advantage that, while continuously providing a service in an existing optical communication system, a service at another communication speed can be realized at low cost.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A station-side optical network terminal apparatus, comprising:
    a first processing unit that performs a process to output an optical signal at one communication speed by the light-emitting unit, and a second processing unit that performs a process to output an optical signal at another communication speed by the light-emitting unit connected to one light-emitting unit;
    a clock control unit that controls the first processing unit and the second processing unit by the same clock;
    a distance measurement unit that measures a distance to a subscriber-side optical network terminal apparatus; and
    an optical output adjustment unit that adjusts an optical output of the light-emitting unit on the basis of the measurement result obtained by the distance measurement unit.

2. The station-side optical network terminal apparatus according to claim 1, wherein the distance measurement unit performs measurement at one of the communication speeds and measurement at the other communication speed so that time zones do not overlap.

3. The station-side optical network terminal apparatus according to claim 1, wherein the distance measurement unit performs time synchronization of the measurement at one of the communication speeds and the measurement at the other communication speed on the basis of a clock of the clock control unit.

4. The station-side optical network terminal apparatus according to claim 1, comprising:
    a redundant bit length determining unit that determines a length of redundant bits added to each frame for error correction on the basis of a measurement result obtained by the distance measurement unit.

5. The station-side optical network terminal apparatus according to claim 4, comprising:
    a redundant bit length designating unit that transmits the length of the redundant bits added to each frame for error correction to the first processing unit, the second processing unit, and a subscriber-side optical network terminal apparatus as designation signals on the basis of a determination result obtained by the redundant bit length determining unit, wherein
    the first processing unit and the second processing unit add redundant bits having lengths based on the designation signals received from the redundant bit length designating unit to the frames for error correction to transmit the frames.

6. The station-side optical network terminal apparatus according to claim 1, comprising:
    a preamble pattern transmitting unit that transmits, to a head of each frame transmitted by the light-emitting unit, a preamble pattern of transmission time depending on the communication speed of the frame.

7. The station-side optical network according to claim 6, comprising:
    a scramble control unit that performs scramble control to an idle pattern transmitted as the preamble pattern.

8. A station-side optical network terminal apparatus, comprising:
    a first processing unit that performs a process to output an optical signal at one communication speed by the light-emitting unit, and a second processing unit that performs a process to output an optical signal at another communication speed by the light-emitting unit connected to one light-emitting unit;
    an error rate detecting unit that detects an error rate; and
    a redundant bit length determining unit that determines a length of redundant bits added to each frame for error correction on the basis of the error rate detected by the error detecting unit.

9. The station-side optical network terminal apparatus according to claim 8, comprising:
    a redundant bit length designating unit that transmits the length of the redundant bits added to each frame for error correction to the first processing unit, the second processing unit, and a subscriber-side optical network terminal apparatus as designation signals on the basis of a determination result obtained by the redundant bit length determining unit, wherein
    the first processing unit and the second processing unit add redundant bits having lengths based on the designation signals received from the redundant bit length designating unit to the frames for error correction to transmit the frames.

* * * * *